US005626885A

United States Patent [19]
Vromans

[11] Patent Number: 5,626,885
[45] Date of Patent: May 6, 1997

[54] METHOD OF MANUFACTURING AN OPTICALLY READABLE DISC, AND ARRANGEMENT FOR CARRYING OUT THE METHOD

[75] Inventor: Petrus H. G. M. Vromans, Eindhoven, Netherlands

[73] Assignee: U.S. Philips Corporation, New York, N.Y.

[21] Appl. No.: 542,000

[22] Filed: Oct. 10, 1995

Related U.S. Application Data

[60] Continuation of Ser. No. 56,644, May 3, 1993, abandoned, which is a division of Ser. No. 795,167, Nov. 18, 1991, Pat. No. 5,242,629.

[30] Foreign Application Priority Data

Nov. 19, 1990 [NL] Netherlands ............................ 9002517

[51] Int. Cl.⁶ ...................................................... B29C 35/00
[52] U.S. Cl. ..................... 425/110; 264/1.33; 264/106; 264/496; 425/150; 425/171; 425/174.4; 425/810
[58] Field of Search ..................................... 264/1.33, 106, 264/107, 314, 406, 496; 425/110, 111, 150, 171, 174.4, 810, 437

[56] References Cited

U.S. PATENT DOCUMENTS

| | | | |
|---|---|---|---|
| 3,303,537 | 2/1967 | Mislan | 425/171 |
| 4,312,823 | 1/1982 | Kraakman et al. | 425/810 |
| 4,313,718 | 2/1982 | Llabres et al. | 264/107 |
| 4,315,723 | 2/1982 | Antoine et al. | 425/110 |
| 4,395,211 | 7/1983 | Broeksema et al. | 425/810 |
| 4,440,699 | 4/1984 | Smid et al. | 425/171 |
| 4,452,748 | 6/1984 | Lange et al. | 425/810 |
| 4,472,124 | 9/1984 | Kashihara et al. | 425/810 |
| 4,615,847 | 10/1986 | Howden | 425/171 |
| 4,670,077 | 6/1987 | Peeters | 156/245 |
| 4,907,956 | 3/1990 | Ezaki et al. | 425/810 |
| 4,995,799 | 2/1991 | Hayashi et al. | 425/810 |

FOREIGN PATENT DOCUMENTS

| | | | |
|---|---|---|---|
| 60-122139 | 6/1985 | Japan | 425/174.4 |
| 1-291926 | 11/1989 | Japan | 425/174.4 |

*Primary Examiner*—C. Scott Bushey

[57] ABSTRACT

An arrangement is provided for a method of manufacturing optically readable discs in which a substrate is placed on a movable substrate carrier and by moving the substrate carrier it is subsequently placed in a centered position on a previously applied amount of replication material on a mold. In this position the substrate is fixed to the mold, after which the substrate carrier releases the substrate and the replication layer in the structure zone is solidified.

6 Claims, 6 Drawing Sheets

METHOD OF MANUFACTURING AN OPTICALLY READABLE DISC, AND ARRANGEMENT FOR CARRYING OUT THE METHOD

RELATED APPLICATIONS

This is a continuation of application Ser. No. 08/056,644, filed May 3, 1993, now abandoned, which is a Divisional of application Ser. No. 07/795,167, filed Nov. 18, 1991 now U.S. Pat. No. 5,242,629.

BACKGROUND OF THE INVENTION

The invention relates to an arrangement for carrying out a method of manufacturing an optically readable disc by forming an optically readable structure in a structure zone on a substrate, the method comprising the application of a replication layer in a deformable phase on a mold having a mold structure, the placement of the substrate on the replication layer, the solidification of the replication layer and its connection to the substrate, and the joint removal of the substrate and the replication layer attached thereto from the mold.

Three U.S. Pat. Nos. 4,670,077, 4,827,469, and 4,911,776 (herewith incorporated by reference) describe a method of the type defined above, and an arrangement and a mold for carrying out the method. The known method can be used, for example, for manufacturing inscribable optical information discs having an optically readable structure comprising servo tracks provided with servo-information. The known method employs a mold mounted on a base. The mold is covered with a radiation-curable transparent lacquer which, after curing, is removed from the mold together with a transparent substrate. In its center the base of the mold has base centering means relative to which the mold structure is centered accurately. Before a substrate is placed on the mould the substrate is provided with central hub means having central disc-centring means to enable the resulting finished information disc to be centered on the drive spindle of a drive arrangement. The intermediate product comprising the substrate with the hub means is centered on the mould base by cooperation of the base-centring means with the disc-centering means. This cooperation is achieved by the use of auxiliary centering means which are brought into contact both with the wall of the centering aperture in the disc hub and with the wall of a central centering recess in the base. Thus, the replication layer is cured in a situation in which the substrate is centered on the mold without clearance. After the intermediate product comprising the substrate and hub with the cured lacquer has been removed from the mold the centering of the disc-centering means relative to the information structure is rigidly maintained. This is because the intermediate product forms an inseparable unit.

The known method is only suited for use with substrates having a central opening and a central hub. This means that it is not suited for discs having a central opening but not a hub, or having a central opening in which a hub is mounted at a later stage. Moreover, the known method is not suited for substrates without a central opening. However, the method described has the advantage that the information structure is centered highly accurately relative to the center of rotation of the substrate. Moreover, this high accuracy can be guaranteed without the need to measure the position of the center of the information structure for every substrate before the hub can be connected to the substrate.

SUMMARY OF THE INVENTION

It is an object of the invention to provide a method and an arrangement for carrying out the method which are suitable for several categories of substrates, inter alia for those categories for which the known method is not suited, while maintaining the advantages of the prior art. For this purpose the invention is characterized in that the substrate is arranged on a movable substrate carrier, by moving the substrate carrier the substrate is brought in a centered position on the replication layer on the mould, the substrate is fixed to the mould in the centered position, after fixation the substrate carrier releases the substrate, and in the fixed position the replication layer in the structure zone is solidified.

The method in accordance with the invention, in contradistinction to the known method, does not require a direct cooperation between centering means of an intermediate product, which comprises a substrate and a hub, with centering means of the mold. Instead of this, use is made of a moving substrate carrier which is capable of placing the substrate on the mold in an accurately centered position. Subsequently, the substrate is fixed on the mold in the centered position, after which the substrate carrier may release the substrate and, if required, may be moved away in order not to obstruct any further process steps.

A very advantageous embodiment of the invention is preferred, which is characterized in that the substrate is fixed to the mold by locally solidifying a part of the replication layer in an area situated outside the structure zone. The present embodiment inventively utilizes the fact that, although ultimately the substrate with the adhering replication layer is, of course, removable from the mold, some degree of adhesion is obtained between the mold and the cured replication layer. If now, for the purpose of securing the substrate to the mold, the replication layer is cured locally, separate means for securing the substrate to the mold will be redundant. Another very important advantage is that fixation is possible without mechanical contact being made with the substrate. Fixation without any mechanical contact means that extraneous forces on the substrate are absent and, consequently, the accurate centering is not disturbed. A very suitable embodiment is characterized in that the substrate is transparent and the replication layer is made of a radiation-curable lacquer, and both the fixation of the substrate to the mold and the solidification of the replication layer in the structure zone are effected by irradiation through the substrate. This embodiment is very suitable for many types of optically readable discs because such discs frequently employ a construction in which the information structure is provided directly on one of the sides of a transparent substrate.

The transparent substrate can be secured to the mold by means of a further interesting embodiment of the invention, which is characterized in that the substrate carrier has a radiation-transmitting part, and the substrate is fixed to the mould by irradiation through said radiation-transmitting part. Very satisfactory results have been obtained with a method which is characterized in that fixation is effected in a circular or annular central fixation zone.

With the method in accordance with the invention the centering accuracy of the finished product depends on the accuracy with which the substrate is positioned on the mould by the substrate carrier. In this respect an embodiment of the invention is important, which is characterized in that in order to obtain discs whose eccentricity is within narrow tolerances a test product is manufactured in a test stage of the method by carrying out the method using a substrate which is roughly centered in the substrate carrier, determining the eccentricity of the optically readable structure of the test product relative to the center of rotation thereof, and correcting the position of the substrate carrier depending on the value of the eccentricity thus determined.

With the prior-art method as defined in the opening paragraph the accuracy of the finished product is dictated by the centering of the mould relative to the base. For this reason the known method includes a method of positioning the mould on the base with high precision. With the method in accordance with the present invention the mould need not be positioned with such a high accuracy, a coarser centering being adequate. However, after placement of a new mold it is necessary to carry out a non-recurrent accurate correction of the position of the substrate carrier. Suitably, this is effected in the manner described. In this respect a further embodiment of the invention is relevant, which is characeterized in that during curing of the replication layer the mold is rotated and, before a substrate is mounted, is set to an initial position which is accurately defined in the direction of rotation. The use of a rotating mold is important for a uniform solidification of the replication layer but also has substantial advantages in carrying out other process steps, as for example rinsing off superfluous lacquer. However, the eccentricity of the rotation of the mold might result in an impermissibly high inaccuracy of the centricity of the manufactured product. The last-mentioned embodiment of the invention provides a solution for this in that, in fact, the mold is returned to always the same initial position before a new substrate is mounted on the mould. Thus, the correction of the substrate carrier position already allows for the eccentricity of the mold rotation.

A very suitable embodiment of the invention is characterised in that the mold has a larger diameter than the substrate and the substrate is covered with a replication layer over its entire surface area. The use of this method results in a substrate and replication layer combination which is also entirely flat at the replication layer side, which may have substantial advantages when at a later stage the substrate is to be connected to another substrate, for example for a two-sided optically readable record carrier.

For a correct replication of the often very delicate information structure a low-viscosity replication material is required and, in addition, it is also important that the replication layer is divided uniformly between the substrate and the mold. In this respect a further embodiment of the invention is relevant, which is characterized in that before the substrate is placed on the mold the mold is brought into a bulged-up shape and the substrate is pressed into the replication layer while at the same time the bulging of the mold is diminished. This embodiment is particularly interesting when comparatively rigid substrates, such as glass substrates, are used. The replication material is applied to the mold in its center and is uniformly spread from the center towards the substrate periphery in radial directions.

The invention relates not only to a method but also to an arrangement for manufacturing an optically readable disc by forming an optically readable structure in a structure zone on a substrate, the arrangement comprising a mold carrier for a mold to be supported thereby and application means for applying a replication material in a deformable phase to the mold. According to the invention such an arrangement is characterised in that the arrangement comprises a substrate carrier which is movable relative to the mold and has holding means for holding a substrate and transfer means for transferring the substrate carrier together with the substrate to and from the mold. Preferably, the arrangement is further characterized in that the mold carrier comprises a rotating turntable having means for securing the mold to the turntable. The advantages of this have already been mentioned in conjunction with the method.

As already stated, the correct distribution of the replication material between the substrate and the mold is important in order to obtain a product of acceptable quality. Therefore, an embodiment of the invention is of interest which is characterized in that the mold has a central opening through which a central cone projects above the mold surface. The replication mass can be applied around the cone. When an arrangement of this type is used the substrate should have a central opening of such a diameter that the cone is engageable therein. After the substrate has been mounted the replication material is divided in a radially outward direction, the cooperation of the cone with the edge of the central opening in the substrate preventing an excessive amount of replication material from being moved in an inward direction. The last-mentioned embodiment can be combined very effectively with a further embodiment which is characterized in that there are provided pneumatic means for bulging up the mold by compressed air. A well-defined displacement of the replication material in a radially outward direction is achieved by bringing the mold gradually from the bulged-up to the flat condition during application of the substrate.

In order to guarantee a small eccentricity of the information structure on the product an embodiment is of interest which is characterized in that the arrangement comprises means for setting the turntable to the initial position in an accurately reproducible manner. The means may be of different nature. In the description with reference to the drawings an embodiment will be described in which the means are of an optoelectronic nature.

A very suitable embodiment of the invention is characterised in that there are provided vacuum means for holding the substrate on the substrate carrier by means a partial vacuum. The advantage is that the object can be gripped at the location of any flat surface by, for example, suction pacts. This minimizes stresses in the object to be held. No moving parts are needed for holding. For gripping or releasing the object it suffices to turn on or turn off the vacuum. Such a technique is therefore eminently suitable for use in an arrangement in accordance with the invention because the substrates are light-weight flat objects which should be gripped with a minimal introduction of stresses and at a location which is not exactly defined in advance.

In the case that the substrate is transparent and the replication material is a radiation-curable material it is very advantageous if for fixing the substrate to the mold embodiment of the arrangement is used which is characterized in that the movable substrate carrier comprises an internal radiation source for centrally fixing the substrate to the mold. Preferably, an embodiment is used which is characterized in that the substrate carrier comprises shielding means to preclude fixation outside the central zone. The last-mentioned embodiment effectively precludes undue curing of replication material outside the fixation zone.

Figure 1:
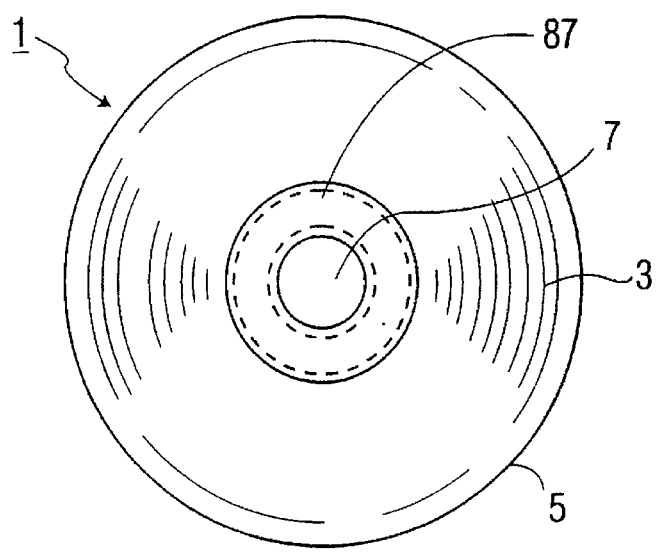
FIG. 1 is a plan view of an optically readable disc manufactured by means of the method in accordance with the invention.

The various Figures are shown to an arbitrary scale which is not always the same.

DETAILED DESCRIPTION OF THE INVENTION

The invention will now be described in greater detail with reference to the figures of the drawing.

The optically readable disc 1 has an optical structure 9 in a structure zone 3 on a substrate 5. The disc has a center hole 7 surrounded by an annular fixation zone 87 to be described hereinafter and having boundaries indicated in broken lines in FIG. 1.

Figure 2:
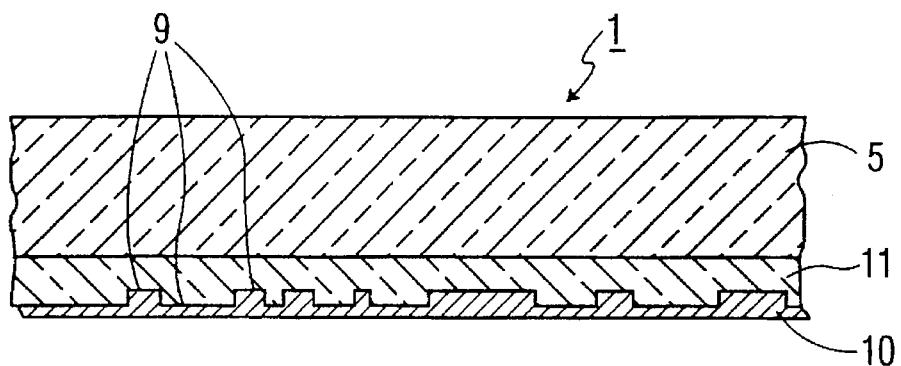
FIG. 2 is a sectional view, to a substantially enlarged scale, of the disc shown in FIG. 1.

The product, of which a small part is shown in a diagrammatic sectional view in FIG. 2, comprises a transparent substrate 5, a transparent replication layer 11 provided with the optically readable structure 9, and a reflection layer 10. The application of the reflection layer falls beyond the scope of the method in accordance with the invention. Such a layer can be applied in known manner, for example by sputtering. If the product is intended for manufacturing a pre-recorded disc, such as an audio disc or video disc, the reflecting layer 10 may be provided with a protective coating at a later stage. Another possibility is to join two discs back to back by means of a suitable adhesive in order to obtain a double-sided disc. Yet another possibility is to unite two discs with one another to form a so-called air sandwich, the substrates being interconnected only at their inner and outer peripheries, a thin layer of air being enclosed between the two reflection layers.

Figure 3:
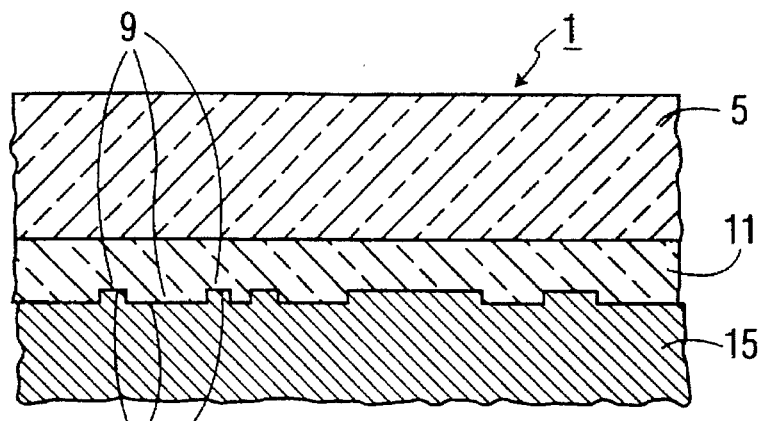
FIG. 3 is a sectional view similar to that shown in FIG. 2 but now showing a substrate on a mold.

FIG. 3 shows how the optically readable structure 9 can be formed. In the example shown the substrate 5 is transparent and the replication layer 11 deposited on the substrate is also transparent. The information structure is replicated from a mold 15. For this purpose the material of the replication layer is applied in a deformable phase between the mold and the substrate and is subsequently cured to a solid form. After curing the replication layer 11 adheres firmly to the substrate 5 but is yet comparatively easy to remove from the mold 15. The mold generally consists of a thin nickel shell which can be manufactured in known manner by electrodeposition.

FIGS. 4 to 8 show an arrangement which provides the substrate 5 with the cured replication layer 11. The arrangement comprises a mold carrier 17 which carries the mold 15. Application means in the form of a pivotable spout 19 for applying the replication material 11 in a deformable phase to the mold 15 is provided. The arrangement further comprises a substrate carrier 21 which is movable relative to the mold 15 and which has holding means 23 and 25 for holding the substrate 5. Moreover, there are transfer means for transferring the substrate carrier with the substrate to and from the mold.

The mold carrier comprises a rotating turntable 17 provided with means for securing the mold to the turntable. This means comprise a ring 27 and a plurality of bolts 29 for fastening the ring to the turntable 17. The ring 27 presses the mold 15 at its circumference against a rim 31 of the turntable and against an O-ring provided on the turntable.

The mold 15 has a central opening through which a central cone 35 projects above the mold surface. The significance of this cone will be explained in the subsequent description of the method. By means of the spout 19 the replication material 11 is deposited around the cone 35 on the mold 15.

Pneumatic means, such as an electrically controlled pneumatic valve 37, a compressed-air source 39, a pneumatic line 41, and an air duct 43 in the turntable 17 are provided. A function of these means is to bulge up the mold 15 by means of compressed air, see also FIGS. 4 and 5. For releasing the compressed air from the space between the turntable 17 and the mold 15 there is provided an outlet duct 45 which can be connected to the pneumatic line 41 by the pneumatic valve 37. By means of the pneumatic valve 37 the line 41 can also be connected to a vacuum source 47, so that the mold 15 can be drawn tightly against the surface of the turntable 17 by means of vacuum. This is of importance in order to obtain a replication layer of satisfactory flatness.

The turntable 17 can be set to an initial position which is accurately defined in the direction of rotation. For this purpose the arrangement comprises suitable means 49 and 51. The means 49 form an optical unit comprising a frame 53 in which a light source 55 and a light-sensitive cell 57 are arranged in facing relationship at opposite sides of an air gap 59. The means 51 comprises a disc which is mounted on the spindle 61 of the turntable 17 and which has a recess 63. The disc 51 is fixedly connected to the spindle 61 and its circumference revolves in the air gap 59 of the optical unit 49. In this way the position of the recess 63 can be detected optically with a satisfactory degree of accuracy.

The afore-mentioned holding, means 23 and 25 of the substrate carrier 21 comprise two series of concentrically arranged suction pads 23 and 25. With the aid of these suction pads and vacuum means 65 to 73 the substrate can be held by the substrate carrier 21 by means of a partial vacuum. The pneumatic means comprise the vacuum lines 65 and 67, represented symbolically in broken lines, which are connected to the suction pads 23 and 25. The flexible vacuum lines are connected to electrically controlled vacuum valves 69 and 71, which are connected directly to a vacuum source 73. The valves 69 and 71 can be controlled independently from one another, so that the suction pads 23 and 25 can be evacuated independently of one another.

The method in accordance with the invention is carried out as follows by means of the shown arrangement.

By means of the spout 19 a certain amount of replication material 11 in a deformable phase, for example a liquid phase, is deposited on the upper side of the mould 15. In the present example the substrate 5 is made of glass and therefore it is comparatively stiff and only flexible to a limited extent. In order to obtain a proper anti uniform distribution of the replication mass 11 the mold 15 is brought in a slightly bulged condition, see FIG. 4, by compressed air from the compressed-air source 39 before or after the application of the replication material. An alternative method, which will not be described any further, employs a more flexible substrate made of a suitable plastics which in a slightly bulged-up condition is mounted onto a flat mold.

The substrate 5 is held on the substrate carrier 21 by means of the suction pads 23 and 25. For a correct centering of the substrate on the substrate carrier the substrate carrier comprises an axially movable centering cone 75. The centering cone is connected to an axially movable pin 79 which is urged downward by a compression spring 81 Mounting the substrate 5 on and removing it from the substrate carrier 21 is effected in a position not shown at some distance from the position shown. The transfer means required for this and for the rest of the method to be described below are of a conventional nature and are not shown in detail in the drawings. The spindle 105 forms part of said means. The means further include a yoke 83 and a locating member 85. When in the operating position the locating member 85 is made to cooperate with an accurately fitting locating aperture in a stationary part of the arrangement this will ensure a well-defined operating position.

Figure 4:
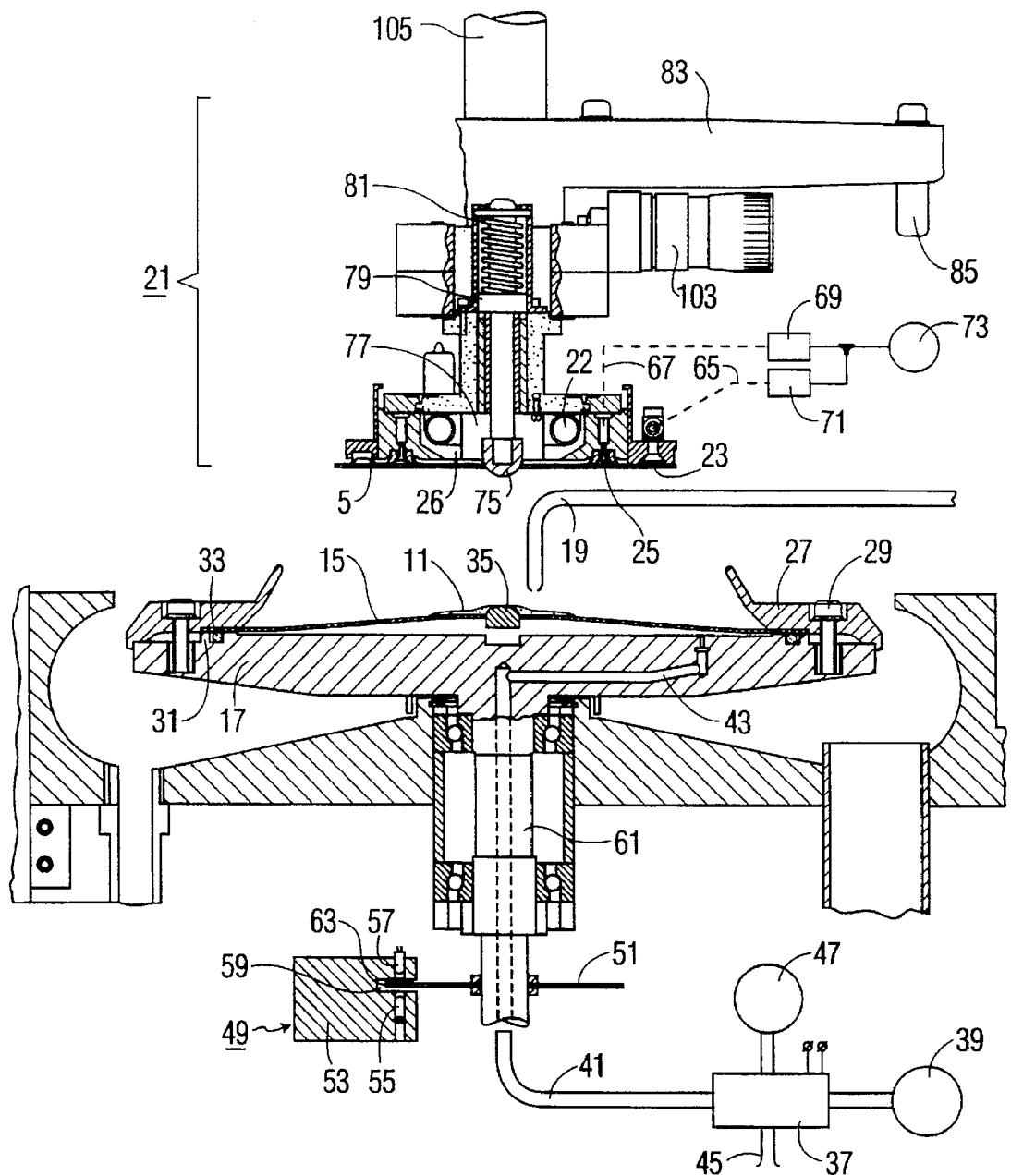
FIG. 4 is a diagrammatical sectional view of an arrangement in accordance with the invention, the substrate carrier and the substrate being shown in an initial position.
Figure 5:
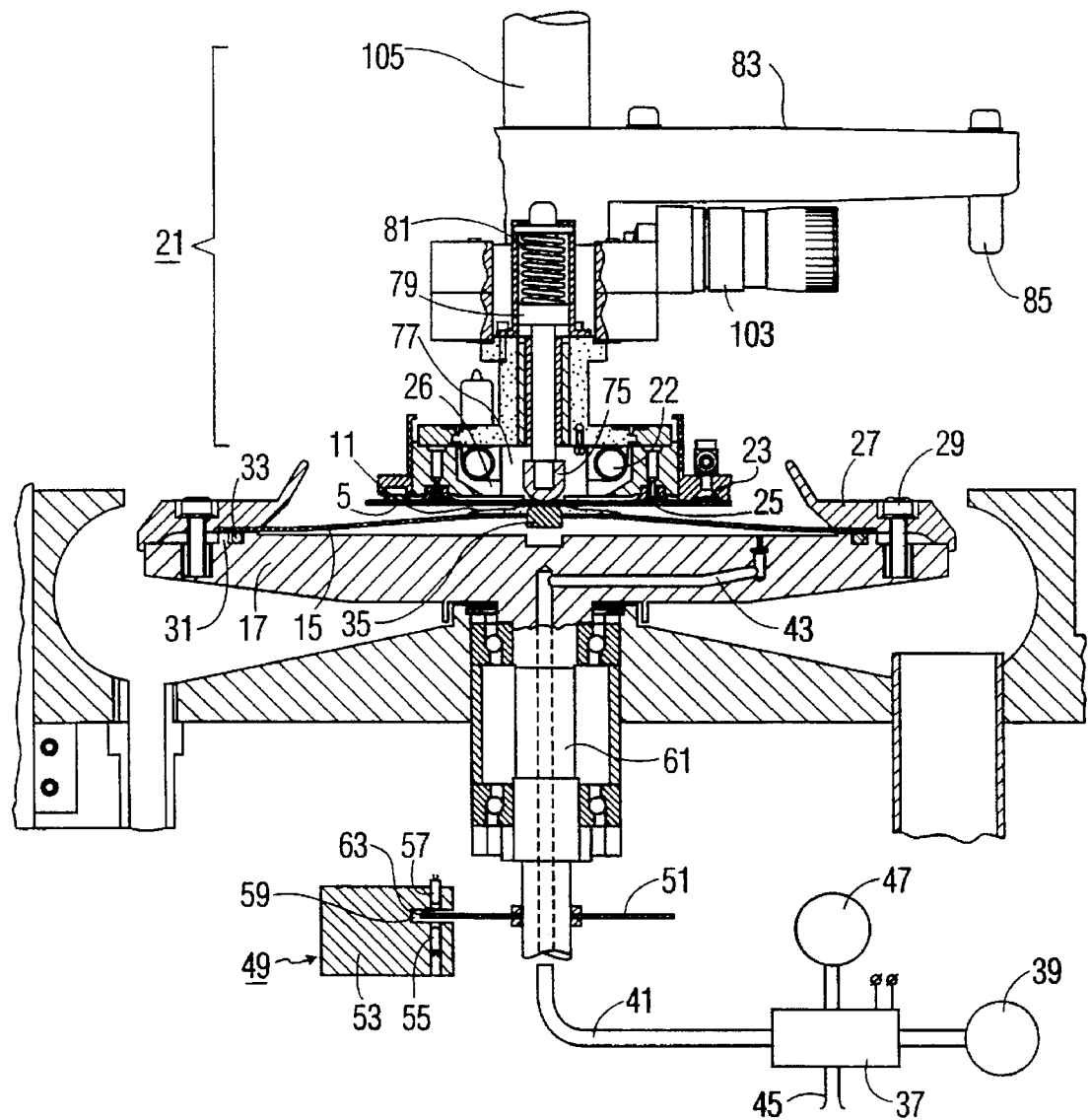
FIG. 5 is similar to FIG. 4 but shows the substrate carrier in a position in which the substrate for the first time comes into contact with the replication material in a central zone.

The substrate carrier 21 together with the substrate 5 is brought from the situation illustrated in FIG. 4 to the situation illustrated in FIG. 5. The cone 75 is pressed upward by the cone 35 against the force of the spring 81, so that the cone 35 engages the center hole 7 in the substrate 5. In this situation pads 25 release the substrate so that under the influence of gravity and under the influence of the radial forces exerted by the cone 35 the substrate can independently assume a correctly centered position on the mold. In this situation the substrate carrier is further lowered and the compressed air in the space between the turntable 17 and the substrate 15 is allowed to escape, so that the initially bulged condition of the mold disappears. As a result of this, the replication material 11 is gradually and uniformly pressed in a radially outward direction. An inward displacement is not or hardly possible through the cooperation between the substrate rim around the center hole 7 and the cone 35. Any redundant replication material will be pressed outward (see FIG. 6) and generally it will not be entirely inevitable that some redundant replication material collects around the cone 35. The cone 75 of the substrate carrier has such a shape that no replication material will settle on it.

Figure 6:
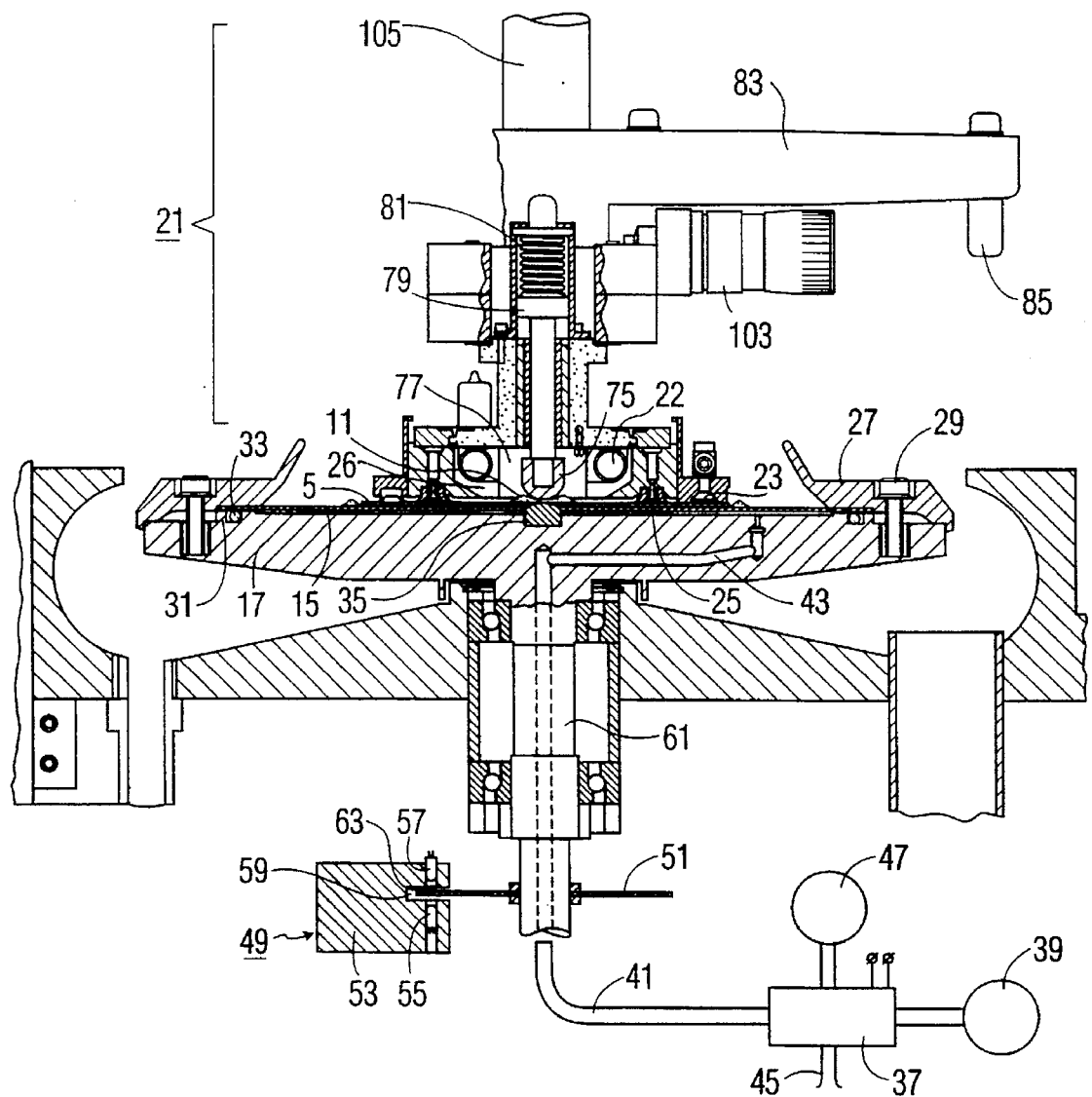
FIG. 6 is similar to the two preceding Figures but shows the substrate carrier in a position in which the replication material has divided between the substrate and the mold.

In the situation illustrated in FIG. 6 the substrate 5 is fixed to the mold 15 in the centered position. This is effected by locally solidifying a part of the replication layer 11 in an area situated outside the structure zone 3. In the present example the substrate consists of a transparent glass type and the replication layer 11 consists of a transparent radiation-curable lacquer. Fixing the substrate 5 to the mold 15 is effected by solidifying a part of the replication layer situated in an annular zone 87 (FIG. 1) between the structure zone 3 and the edge of the center hole 7. For the purpose of solidification, an annular lamp 22 arranged inside the substrate carrier 21 is used. This lamp is situated in the space 26 which is open towards the substrate side. The cylindrical shield 77 ensures that the light of the lamp 22 can only emerge through an annular opening.

Figure 7:
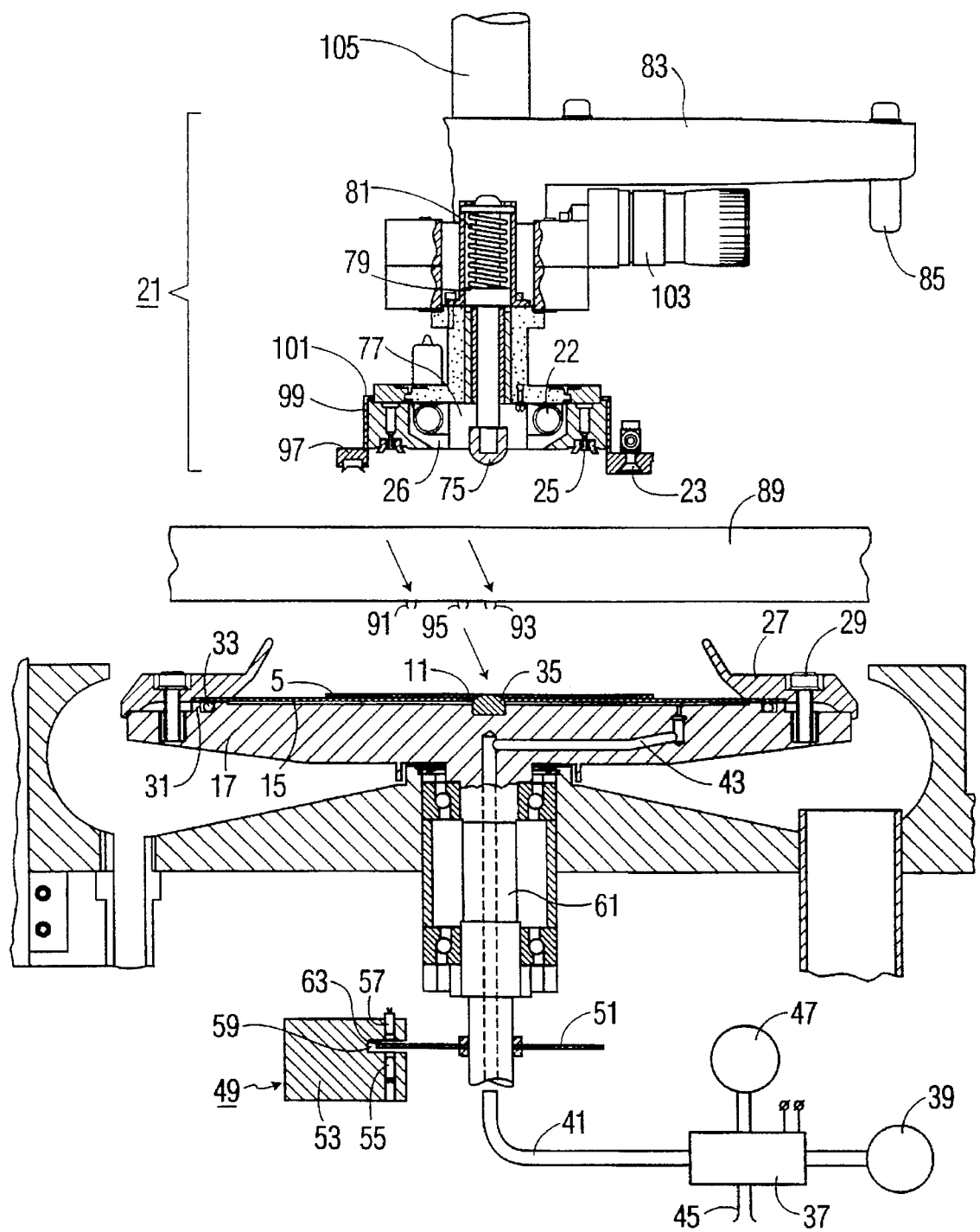
FIG. 7 is similar to the three preceding Figures but shows the substrate carrier in a position moved away from the substrate and with an exposure and rinsing unit, shown diagrammatically, situated between the substrate and the substrate carrier.

After solidification of the fixation zone the substrate carrier is moved away from the mold into the position shown in FIG. 7. An exposure and rinsing unit 89, shown only diagrammatically in FIG. 7, is now moved between the substrate carrier and the turntable 17. The turntable 17 is rotated while exposure means, not shown and belonging to the unit 89, expose the residual replication material for the purpose of curing. Two ports 91 and 93 are used for applying a solvent for dissolving and rinsing off redundant replication material. Moreover, there is provided a blowing nozzle 95 for blowing away excess solvent and replication material at the location of the edge of the center hole 7 of the substrate.

After the replication layer has been cured and redundant material has been rinsed off the turntable 17 is stopped and the exposure and rinsing unit 89 is moved away out of its position between the substrate carrier and the turntable 17. Once the turntable 17 has stopped the substrate with the replication layer attached to it can be removed from the mold.

Figure 8:
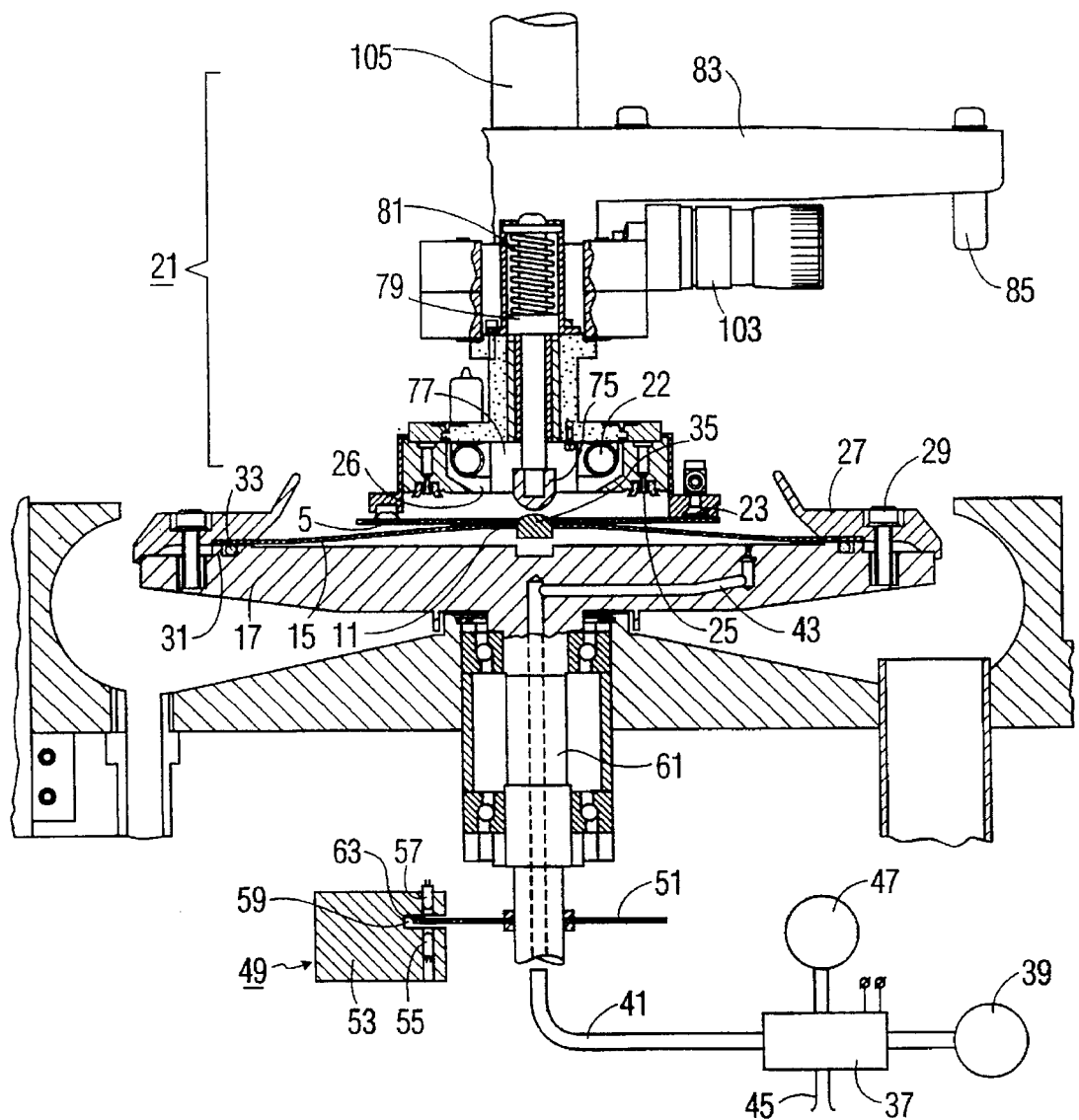
FIG. 8 is similar to FIGS. 4 to 6 but shows the substrate carrier again in contact with the substrate for the removal of the substrate from the mold.

As can be seen in FIGS. 7 and 8 the suction pads 23 of the substrate carrier are situated on an external flange 97 of a sliding bushing 99. At the top the sliding bushing has an annular stop 101 to ensure that under the influence of gravity the sliding bushing cannot be lowered any further than shown in FIGS. 7 and 8.

Removal of the substrate with the attached replication layer from the mold proceeds as follows. When compressed air from the compressed-air source 39 is admitted underneath the mold 15 the mold is pressed upward, so that the edge of the substrate and then progressively more inward parts of the substrate become detached from the mold. The substrate carrier is lowered from its position shown in FIG. 7 into the position shown in FIG. 8. By evacuating the suction pads 23 by means of the vacuum source 37 the substrate 5 is drawn against the substrate carrier at its upper side near its circumferential edge, after which the substrate can be moved upward together with the substrate carrier. By turning off the vacuum the suction pads 23 will release the substrate, so that the product can be removed. In general, this will be effected in a position at some distance from the turntable 17.

The figures of the drawings show a micromanipulator 103 by means of which the position of the substrate carrier in a direction parallel to the plane of drawing can be adjusted with high accuracy. The drawings do not show a second micromanipulator which enables the position of the substrate carrier in a direction transverse to the plane of drawing to be adjusted. These two adjustment means enable the position of the substrate carrier to be corrected in two mutually perpendicular positions parallel to the surface of the turntable 17. This correction possibility is of the utmost importance to guarantee that products are manufactured with an eccentricity not exceeding a prescribed permissible eccentricity. The procedure required for this must be carried out only once after every mold change. For changing a mold the ring 27 is removed, after which the mold 15 can be replaced by another mold. By refitting the ring 27 this mold is secured to the turntable 17 with an overall accuracy which may be inadequate for the product. A substrate 5 is placed on the substrate carrier 21 in a manner as described above and a test product is manufactured wholly in conformity with the method described above. The finished product is removed from the substrate carrier and by means of suitable measuring instruments, preferably optical measuring instruments, the eccentricity of the optically readable structure of the test product relative to the centre of rotation is measured. The corrections to be applied by means of the manipulators can be derived from the measurement results. After the necessary corrections have been applied subsequent products can be manufactured with the required accuracy of the eccentricity of the optically readable structure without any further corrections being needed.

Although the above description of a device and a method is based on only one embodiment, the invention is not limited to this embodiment. For example, the substrate and/or the replication layer need not be transparent and curing need not be effected by means of radiation. Non-transparent substrates and replication layers may be used and other methods of chemical or physical hardening are applicable. The essence of the invention resides in the fact that a substrate is accurately centred on a mould by means of a substrate carrier, the substrate is secured to the mould in a centered position through local fixation, and the substrate is subsequently released from the substrate carrier to allow the replication layer to be cured in the structure zone without contact with the substrate carrier and preferably while the mold is rotating. The substrate can be fixed to the mould in an entirely other manner than described. For example, there may be provided movable fixation means which temporarily hold the substrate. Another method is the use of a vacuum to hold the substrate temporarily.

I claim:

1. An arrangement for manufacturing an optically readable disc by forming an optically readable structure in a structure zone on a substrate, the arrangement comprising a mold, a mold carrier for supporting the mold, application means for applying a replication material in a deformable phase to the mold, a substrate carrier movable relative to the mold, said substrate carrier being provided with means for holding a substrate, transfer means for transferring the substrate carrier together with the substrate to and from the mold and pneumatic means for bulging up the mold by means of compressed air.

2. An arrangement for manufacturing an optically readable disc by forming an optically readable structure in a structure zone on a substrate, the arrangement comprising a mold, a mold carrier for supporting the mold, application means for applying a replication material in a deformable phase to the mold, said replication material being a radiation-curable lacquer, a transparent substrate, a substrate carrier movable with regard to the mold, said substrate carrier being provided with means for holding a substrate, a radiation-transmitting part and an internal radiation source for centrally fixing the substrate to the mold and solidification of a replication layer formed of a radiation-curable lacquer by radiation through said radiation-transmitting part of the substrate and transfer means for transferring the substrate carrier together with the substrate to and from the mold.

3. The arrangement of claim 2 wherein the substrate carrier comprises shielding means for precluding fixation outside of an annular central fixation zone.

4. An arrangement for manufacturing an optically readable disc by forming an optically readable structure in a structure zone on a substrate, the arrangement comprising a mold, the mold having a central opening, a central cone projecting through the opening and above the mold surface, a mold carrier for supporting the mold, the mold carrier comprising a rotatable turntable provided with means for securing the mold to the turntable, means for setting the turntable to an initial position in an accurately reproducible manner comprising a disc means provided with a recess, and, rotatable with the turntable, optical means for determining the position of the recess, application means for applying a replication material in a deformable phase to the mold and a substrate carrier movable relative to the mold, the substrate carrier being provided with means for holding a substrate and transfer means for transferring the substrate carrier together with the substrate to and from the mold.

5. The arrangement of claim 4 wherein the disc means is provided on a spindle extending from said cone.

6. The arrangement of claim 5 wherein the optical means comprises a light source and a light-sensitive cell, said light source and said light-sensitive cell being separated from each other by said disc means.

* * * * *